US007707286B2

(12) United States Patent
Gundu et al.

(10) Patent No.: US 7,707,286 B2
(45) Date of Patent: Apr. 27, 2010

(54) METHODS FOR MANAGING PRESENCE INFORMATION IN A REAL-TIME COMMUNICATIONS NETWORK

(75) Inventors: Veerabhadra Gundu, San Mateo, CA (US); Nizar Purayil, Kerala State (IN)

(73) Assignee: Sonim Technologies, Inc., San Mateo, CA (US)

( * ) Notice: Subject to any disclaimer, the term of this patent is extended or adjusted under 35 U.S.C. 154(b) by 312 days.

(21) Appl. No.: 11/747,480

(22) Filed: May 11, 2007

(65) Prior Publication Data

US 2007/0288621 A1 Dec. 13, 2007

Related U.S. Application Data

(60) Provisional application No. 60/799,780, filed on May 11, 2006.

(51) Int. Cl.
H04B 7/00 (2006.01)
(52) U.S. Cl. ............... 709/224; 709/203; 709/223; 709/207; 709/228; 709/225; 370/232; 370/260; 370/342; 455/41.2; 455/518; 455/412.2
(58) Field of Classification Search ................ 709/204, 709/225, 228; 370/232, 254, 342; 455/518
See application file for complete search history.

(56) References Cited

U.S. PATENT DOCUMENTS

| | | | |
|---|---|---|---|
| 7,149,288 B2 | 12/2006 | Digate et al. | |
| 2002/0129103 A1* | 9/2002 | Birkler et al. ............. | 709/203 |
| 2005/0169223 A1* | 8/2005 | Crocker et al. ............. | 370/342 |
| 2006/0031368 A1* | 2/2006 | deCone .................... | 709/207 |
| 2006/0084454 A1* | 4/2006 | Sung et al. ................ | 455/518 |
| 2006/0087971 A1* | 4/2006 | Kim et al. ................. | 370/232 |
| 2006/0099911 A1* | 5/2006 | Shibuya ................... | 455/41.2 |
| 2006/0101143 A1* | 5/2006 | Garcia et al. ............. | 709/225 |
| 2006/0120308 A1* | 6/2006 | Forbes et al. ............. | 370/260 |
| 2006/0149811 A1* | 7/2006 | Bennett et al. ............. | 709/203 |
| 2006/0211438 A1* | 9/2006 | Sung et al. ................ | 455/518 |
| 2006/0240855 A1* | 10/2006 | Kalhan ..................... | 455/518 |
| 2007/0002779 A1 | 1/2007 | Lee et al. | |
| 2007/0026882 A1* | 2/2007 | Harris et al. ............. | 455/518 |
| 2007/0026883 A1 | 2/2007 | Sung et al. | |
| 2007/0121528 A1* | 5/2007 | Sakata et al. ............. | 370/254 |
| 2007/0150605 A1* | 6/2007 | Christoffersson et al. ... | 709/228 |
| 2008/0299948 A1* | 12/2008 | Rosener ................... | 455/412.2 |

OTHER PUBLICATIONS

Rosenberg, RFC 3856—A Presence Event Package for the Session Initiation Protocol (SIP), 2004, RFC 3856.*

(Continued)

Primary Examiner—Ashok B Patel
Assistant Examiner—Andrew Goldberg
(74) Attorney, Agent, or Firm—Kali Law Group, P.C.

(57) ABSTRACT

Methods for updating presence information between a first user equipment (UE) and a second UE over a communications network are presented including: on an INVITE message delivery failure to the second UE from the first UE, sending a first PUBLISH message on behalf of the second UE to a presence server by a communications server; sending a NOTIFY message to the first UE by the presence server; and setting a current presence status of the second UE to UNAVAILABLE. In some embodiments, methods further include: if an immediately previous presence status of the second UE is set to AVAILABLE, sending a NOTIFY message to all watchers of the second UE to indicate the current presence status of the second UE. In some embodiments, the first PUBLISH message utilizes a user-agent header to indicate that the communications server originated the first PUBLISH message.

10 Claims, 6 Drawing Sheets

OTHER PUBLICATIONS

Rosenberg, Session Initiation Protocol (SIP) Extension for Instant Messaging, Dec. 2002, RFC 3428.*

Fong, Towards an open protocol for secure online presence notification, 2001, section 5 talks about presence updates without polling.*

International (PCT) Search Report mailed Aug. 21, 2008, regarding PCT/US2008/063092.

Written Opinion mailed Aug. 21, 2008, regarding PCT/US2008/063092.

* cited by examiner

METHODS FOR MANAGING PRESENCE INFORMATION IN A REAL-TIME COMMUNICATIONS NETWORK

PRIORITY CLAIM TO PROVISIONAL APPLICATION

A claim for priority is hereby made under the provisions of 35 U.S.C. §119 for the present application based upon U.S. Provisional Application No. 60/799,780 on May 11, 2006, which is incorporated herein by reference.

BACKGROUND

Presence is a service that allows communicating devices to publish their current presence information and fetch the presence information of other users connected with a communication network. Presence information is exchanged using IETF simple based PUBLISH, SUBSCRIBE, and NOTIFY messages in a communication network. These messages are periodically sent between subscribed user equipment (UE) and a server to keep presence information up-to-date. The frequency of these messages is an engineering compromise (typically 1 hour) between network traffic and the validity of presence information.

In conventional examples, users may travel into and out of a network coverage area and may become temporarily or permanently inaccessible. When a user becomes inaccessible, presence information about that user may remain incorrectly published due to delays in updating presence information on a communication network. Thus, a user may appear "available," but a call cannot be established because the user is, in fact, "unavailable." This disparity may contribute to a perception that all presence information is unreliable. One way to address this problem is to increase the frequency of presence updates. However, this is an obvious but expensive solution to the problem.

At least two message delivery failure situations are possible candidates for a proactive presence update from the server itself. These situations and some corresponding strategies for achieving more accurate presence information are presented herein. Utilizing embodiments describe herein may not only improve user confidence in presence information but also optimize message traffic in a communication network. In addition, changes proposed in embodiments herein, are within the existing OMA-based presence framework. As such, methods for managing presence information in a real-time communications network are presented herein.

Presence specifications, standards and requirements are discussed in greater detail in the following technical specifications from Open Mobile Alliance (OMA), which are hereby incorporated by reference in their entirety:

OMA Presence SIMPLE specification, Candidate Version 1.0-10 Jan. 2006; and

OMA PoC Control Plane, Candidate Version 1.0-27 Jan. 2006.

Other references pertinent to this patent application are also the following specifications from the Internet Engineering Task Force (IETF), which are hereby incorporated by reference in their entirety:

IETF RFC 3863 PIDF—Presence Information Data Format; and

IETF RFC 3903 Session Initiation Protocol (SIP) Extension for Event State Publication.

PTT System Overview

FIG. 1 is an illustrative prior art representation of a PoC System Architecture in accordance with OMA PoC/PAG version 1 specifications. An OMA PoC system architecture 100 includes User Equipment (UE) 102 and a set of network components. As illustrated, UE 102 contains the necessary pieces to interface the user acting as participant in a PoC session under the OMA version 1 specifications. UE 102 can either be a mobile terminal, a PC or any other device connected to the access network. Device Management (DM) client 104 inside UE 102 is used to bootstrap UE 102 with necessary configuration data from a DM server 116. An XML Document Management Client (XDMC) 110 is used to download and update by request any relevant contact lists stored in Shared XML Document Management Server (XDMS) 122. An Aggregation Proxy 124 may be configured to perform the authentication of any such requests. Similarly, the XDMC 110 is also configured to communicate via Aggregation Proxy 124 with PoC-specific XDMS (PoC XDMS) 126 for the purpose of managing group policies and authorization lists. UE 102 further includes Presence Source 106 and Presence Watcher 108. Presence Source 106 may be configured to publish a UE's availability status to other users. Presence Watcher 108 may be configured to retrieve availability status of others (e.g. other UEs and contacts). Both UE presence entities communicate with Presence Server 120 via a SIP/IP Core 118. In an OMA PoC system built on top of a GPRS radio network, a SIP/IP Core is often a IP Multimedia Subsystem (IMS) as standardized by the 3rd Generation Partnership Project (3GPP).

A PoC client's main responsibilities are: session management, SIP registration, TBCP request-response management, media transmission, and media reception. Under existing standards, session management, SIP registration may be accomplished over POC-1 and POC-2 interfaces 132 and 136 respectively. Furthermore, TBCP request-response management, media transmission, and media may be accomplished over POC-3 interface 134. PoC server 128 is responsible for application level network functionality including PoC session establishment, termination, handling of TBCP messages and media switching between the participating clients.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for updating presence information between a first user equipment (UE) and a second UE over a communications network are presented including: on an INVITE message delivery failure to the second UE from the first UE, sending a first PUBLISH message on behalf of the second UE to a presence server by a communications server; sending a NOTIFY message to the first UE by the presence server; and setting a current presence status of the second UE to UNAVAILABLE. In some embodiments, methods further include: if an immediately previous presence status of the second UE is set to AVAILABLE, sending a NOTIFY message to all watchers of the second UE to indicate the current presence status of the second UE. In some embodiments, the first PUBLISH message utilizes a user-agent header to indicate that the communications server originated the first PUBLISH message. In some embodiments, methods further include utilizing the first PUBLISH message to indicate the current presence status of the second UE until the presence server receives a second PUBLISH message from the second UE; and when the presence server receives the second PUBLISH message, discarding the first PUBLISH message. In some embodiments, the NOTIFY message and the first PUBLISH message each utilized an originator field to indicate a source of the current presence status. In some embodiments, the NOTIFY message and the first PUBLISH message are Presence Information Data Format (PIDF) compliant. In some embodiments, the presence server maintains presence information from any source as a separate PUBLISH session. In some embodiments, the communications network is a Push-to-Talk over Cellular (PoC) system and the communications server includes a PoC server for handling messages and media between the first UE and the second UE.

In other embodiments methods for updating presence information between a first user equipment (UE) and a second UE over a communications network, are presented including: on a NOTIFY message delivery failure to the second UE from a presence server, starting a grace timer; sending a first presence status to the first UE that the second UE is UNAVAILABLE; storing any pending presence updates of the second UE on the presence server; if the grace timer expires, sending a second NOTIFY message to the second UE; if the second NOTIFY message is delivered, restoring a SUBSCRIBE session of the second UE, sending a second presence status to the first UE that the second UE is AVAILABLE, sending all pending presence updates to the second UE, and if the second NOTIFY message is not delivered, deleting the SUBSCRIBE session of the second UE. In some embodiments methods further include: if the presence server receives a PUBLISH message from the second UE, restoring the SUBSCRIBE session of the second UE; sending the second presence status to the first UE that the second UE is AVAILABLE; and sending all pending presence updates to the second UE. In some embodiments methods further include: if the presence server receives a SUBSCRIBE message from the second UE, restoring the SUBSCRIBE session of the second UE; and sending the second presence status to the first UE that the second UE is AVAILABLE; and sending all pending presence updates to the second UE. In some embodiments the presence server is configured with a maximum threshold UE limit for determining whether to send substantially simultaneous NOTIFY messages to all users, such that when the maximum threshold UE limit is exceeded, the NOTIFY message delivery failure is ignored and the substantially simultaneous NOTIFY messages are not sent. In some embodiments, the grace timer is set to a static value, wherein the static value is set to a value lower than a configured SUBSCRIBE timer. In some embodiments, the grace timer is set to a dynamic value, wherein the dynamic value is set to a value equal to a time remaining in the SUBSCRIBE session plus one minute.

In other embodiments, methods for updating presence information between a first user equipment (UE) and a second UE over a communications network are presented including: on a NOTIFY message delivery failure to the second UE from a presence server, requesting a new PUBLISH message from the second UE by the presence server; sending a first presence status to the first UE that the second UE is UNAVAILABLE; storing any pending presence updates of the second UE on the presence server; and if the second UE responds to the new PUBLISH message request before an original PUBLISH timer expires, restoring a SUBSCRIBE session of the second UE, sending a presence status to the first UE that the second UE is AVAILABLE, and sending all pending presence updates to the second UE. In some embodiments, the PUBLISH timer is set to an interval in the range of approximately 30 to 60 minutes in a low-bandwidth network and 5 to 15 minutes in a high-bandwidth network.

BRIEF DESCRIPTION OF THE DRAWINGS

The present invention is illustrated by way of example, and not by way of limitation, in the figures of the accompanying drawings and in which like reference numerals refer to similar elements and in which.

| GLOSSARY | |
|---|---|
| GSM—Global System for Mobile communication | A second-generation digital technology originally developed for Europe and includes greater than 71% of the world mobile communication market. Initially developed for operation in the 900 MHz band, GSM has been modified for use in the 850, 1800 and 1900 MHz bands. |
| IMS Core—IP Multimedia Subsystem | A server engine that controls call sessions over IP networks. IMS Core system interacts with the HSS and the PoC Server by way of SIP messages to create PTT sessions. |
| PAG—Presence and Availability Group | A working Group within Open Mobile Alliance (OMA) for the standardization of presence and list management services. |
| PIDF—Presence Information Data Format | PIDF defines base presence format and extensibility. Extensibility may be utilized by a presence application to define its own status values. |
| PoC—Push-to-Talk-over-Cellular | Push-to-Talk standard from Open Mobile Alliance using the IP bearer of cellular packet switched networks such as GPRS. |
| PTT—Push-to-Talk | Similar to conventional walkie-talkie communication - users send a voice message to one or more recipients from a mobile phone by pushing a key. |

-continued

GLOSSARY

| | |
|---|---|
| SIP—Session Initiation Protocol | A signaling protocol for Internet conferencing, telephony, presence, events notification, and instant messaging. |
| UE—User Equipment | UE a device utilized by a user to access a communications network. All UE is configured with an installed PoC client application. For purposes of the present invention, the terms user and UE are synonymous. |

DETAILED DESCRIPTION

The invention is described with reference to specific architectures and protocols. Those skilled in the art will recognize that descriptions are provided to illustrate and provide a best mode of practicing the invention. The description is not meant to be limiting. For example, reference is made to an OMA PoC system, while other types of real-time communications systems using presence, e.g. Voice over IP (VoIP) in mobile and fixed networks, may also benefit from embodiments of the present invention. In other examples, reference is made to the triggering of presence updates for a failed call attempt while embodiments of the present invention may be equally applied during other phases of a call, e.g. for a sustained lost connection occurring in the middle of a call. Thus, it will be apparent to one skilled in the art, that the present invention may be practiced without some or all of these specific details. In other instances, well known process steps and/or structures have not been described in detail in order to not unnecessarily obscure the present invention.

Figure 1:
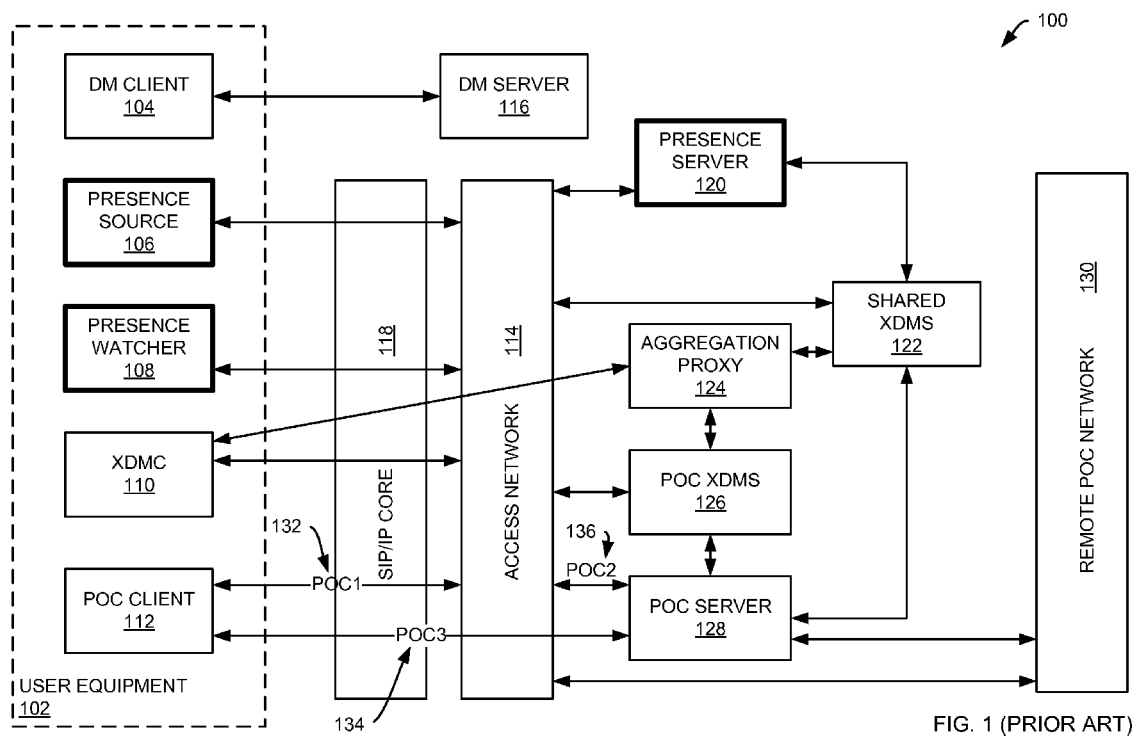
FIG. 1 is an illustrative prior art representation of a PoC System Architecture in accordance with OMA PoC/PAG version 1 specifications.
Figure 2:
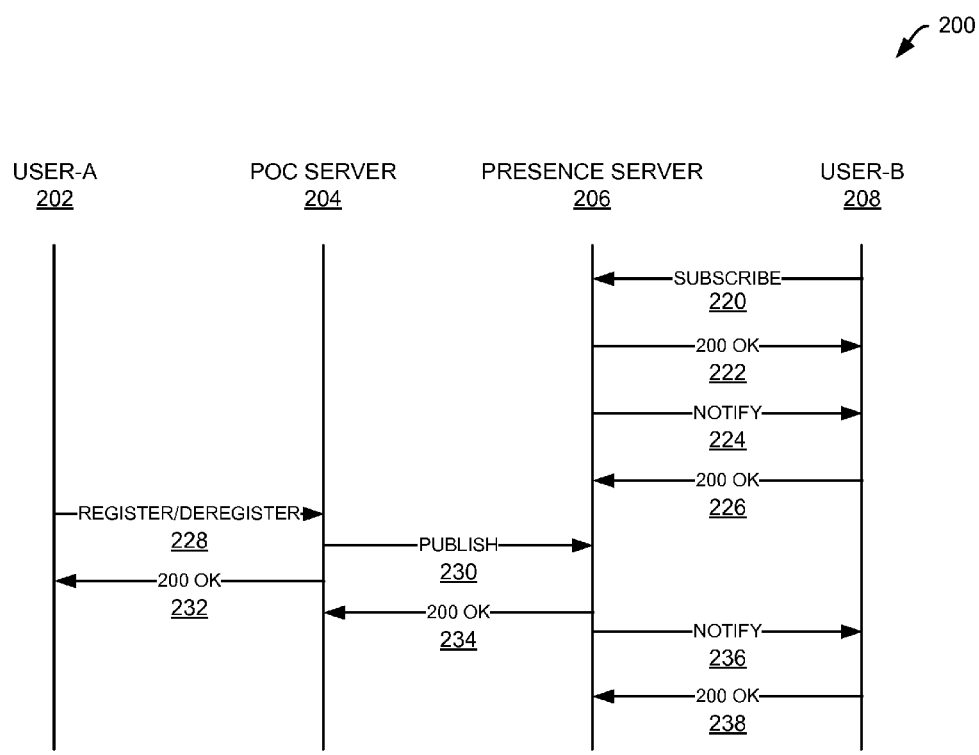
FIG. 2 is an illustrative prior art dataflow diagram illustrating Presence Publish in accordance with OMA PoC/PAG version 1 specifications.

FIG. 2 is an illustrative prior art dataflow diagram 200 illustrating Presence Publish in accordance with OMA PoC/PAG version 1 specifications. As illustrated, message flow occurs between user-A 202 and user-B 208 through communication network elements PoC server 204 and presence server 206. For purposes of the present invention, the terms user and user equipment (UE) are synonymous. For simplicity, access network 114 and SIP/IP Core 118 (see FIG. 1) are not shown in FIG. 2 or subsequent figures. PoC server 204 manages all call related messages, parameters, and specific messages. Further, PoC server 204 handles presence information as well. The dataflow begins when user-B 208 sends SUBSCRIBE message 220 to presence server 206, whereupon presence server 206 returns acknowledgement (200 OK) message 222 to user-B as per SIP standards. A SUBSCRIBE message indicates to a presence server that a user wishes to receive presence information about other subscribed users. Presence server 206 then sends NOTIFY message 224 to user-B, whereupon user-B returns acknowledgement (200 OK) message 226 to presence server 206. A NOTIFY message contains presence information requested when a user subscribes with a presence server.

At some point later in time, user-A 202 sends REGISTER/DEREGISTER message 228 to PoC server 204, whereupon PoC server 204 returns acknowledgement (200 OK) message 232 to user-A 202. Upon receiving REGISTER/DEREGISTER message 228, PoC server 204 sends PUBLISH message 230 to presence server 206, whereupon presence server 206 returns acknowledgement (200 OK) message 234 to PoC server 204. A PUBLISH message typically includes updated presence information about an originator of the message. Conventionally, when a PoC server receives a REGISTER message, a positive presence is conveyed to a presence server. When a PoC server receives a DEREGISTER message, the presence information of the source is negated. Upon receiving PUBLISH message 230, presence server 206 communicates presences information to user-B 208 by sending NOTIFY message 236, whereupon user-B returns acknowledgement (200 OK) message 238 to presence server 206. A presence server may publish presence information received directly from a user, or from a PoC server as illustrated.

Figure 3:
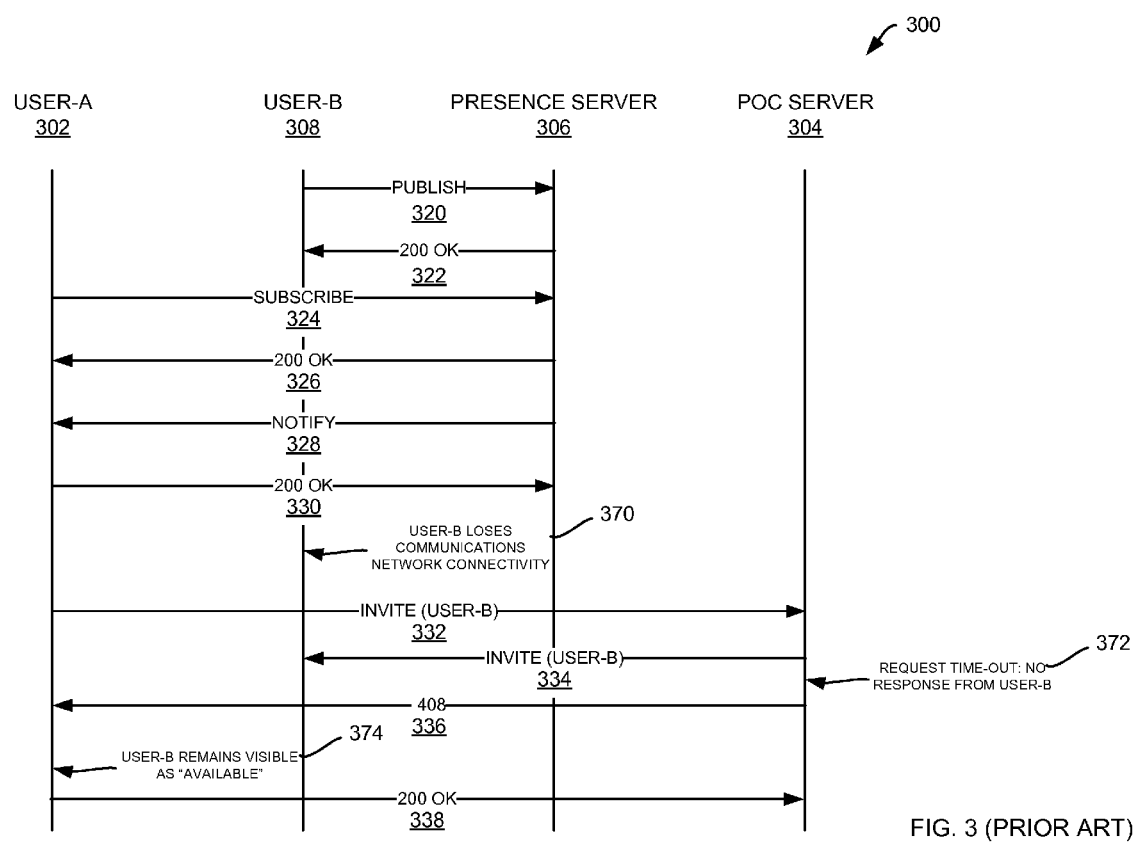
FIG. 3 is an illustrative prior art dataflow diagram illustrating a failed PoC session establishment in accordance with OMA PoC/PAG version 1 specifications.

FIG. 3 is an illustrative prior art dataflow diagram 300 illustrating a failed PoC session establishment in accordance with OMA PoC/PAG version 1 specifications. The dataflow begins when user-B 308 sends a PUBLISH message 320 to presence server 306, whereupon presence server 306 returns acknowledgement (200 OK) message 322 to user-B 308. As noted above, a PUBLISH message typically includes updated presence information about an originator of the message. In this example, user-B's status indicates "available." At some point later in time, user-A 302 sends SUBSCRIBE message 324 to presence server 306, whereupon presence server 306 returns acknowledgement (200 OK) message 326 to user-A 306. Presence server 306 then sends NOTIFY message 328 to user-A 302, whereupon user-A 302 returns acknowledgement (200 OK) message 330 to presence server 306. In this example, NOTIFY message 328 gives user-A 302 presence information about user-B 308 and all other subscribers to the session. At some point later in time, user-B 308 loses communications network connectivity 370. Network connectivity may be lost in any number of manners including software related issues, hardware related issues, and location related issues. At some point in time before presence server 306 updates presence information, user-A 302 initiates a call to user-B 308. To do so, user-A 302 sends INVITE message 332 to PoC server 304. Upon receiving INVITE message 332, PoC server 304 sends INVITE message 334 to user-B 308 whose presence information indicates "available" both to user-A 302 and to PoC server 304. Because user-B 308 has lost connectivity, INVITE message 334 fails to reach user-B. When message delivery fails, PoC server 304 sends 408 request timeout message 336 to user-A 302 indicating that the call has failed in accordance with OMA PoC/PAG version 1 specifications, whereupon user-A 302 returns acknowledgement (200 OK) message 338 to PoC server 304.

Figure 4:
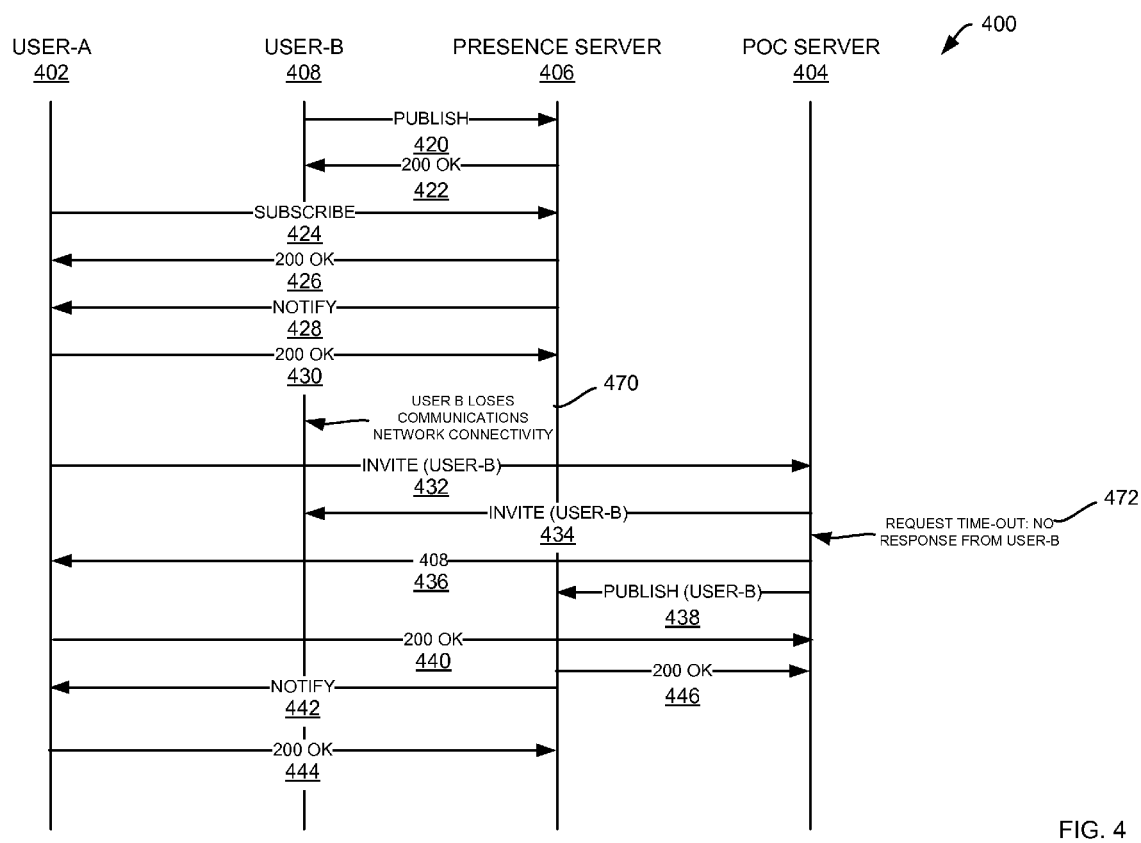
FIG. 4 is an illustrative dataflow diagram illustrating a failed PoC session in accordance with embodiments of the present invention.

Thus, although user-B 308 has lost connectivity, user-A 302 continues to remain unaware of user-B's unavailability because presence server 306 has not updated presence information to all subscribers in accordance with conventional methods. As noted above, this condition may, in some circumstances, may result in a loss of confidence in presence information displayed to a user FIG. 4 is an illustrative dataflow diagram 400 illustrating a failed PoC session in accordance with embodiments of the present invention. As above, the dataflow begins when user-B 408 sends a PUBLISH message 420 to presence server 406, whereupon presence server 406 returns acknowledgement (200 OK) message 422 to user-B 408. As noted above, a PUBLISH message typically includes updated presence information about an originator of the message. In this example, user-B's status indicates "available." At some point later in time, user-A 402 sends SUBSCRIBE message 424 to presence server 406, whereupon presence server 406 returns acknowledgement (200 OK) message 426 to user-A 406. Presence server 406 then sends NOTIFY message 428 to user-A 402, whereupon user-A 402 returns acknowledgement (200 OK) message 430 to presence server 406. In this example, NOTIFY message 428 gives user-A 402 presence information about user-B 408 and all other subscribers to the session. At some point later in time, user-B 408 loses communications network connectivity 470. Network connectivity may be lost in any number of manners including software related issues, hardware related issues, and location related issues. At some point in time before presence server 406 updates presence information, user-A 402 initiates a call to user-B 408. To do so, user-A 402 sends INVITE message 432 to PoC server 404. Upon receiving INVITE message 432, PoC server 404 sends INVITE message 434 to user-B 408 whose presence information indicates "available" both to user-A 402 and to PoC server 404. Because user-B 408 has lost connectivity, INVITE message 434 fails to reach user-B. When message delivery fails, PoC server 404 sends 408 request timeout message 436 to user-A 402 indicating that the call has failed in accordance with OMA PoC/PAG version 1 specifications, whereupon user-A 402 returns acknowledgement (200 OK) message 440 to PoC server 304. In some embodiments, PoC server 404 may receive a 408 request timeout from an IMS core.

In accordance with embodiments of the present invention, PoC server 404 may be configured to send PUBLISH message 438 to presence server 406 in response to message delivery failure to indicate "unavailability" of user-B 408, whereupon presence server 406 returns acknowledgement (200 OK) message 446 to PoC server 404. Upon receiving PUBLISH message 438, presence server 406 sends NOTIFY message 442 to user-A 402 indicating user-B's "unavailability," whereupon user-A 402 returns acknowledgement (200 OK) message 444 to presence server 406. In PUBLISH message 438, a user-agent header may be set to "OMA PoC server" so that presence server 406 knows that PUBLISH message 438 is from a different source (i.e. PoC server 404) than the original presence source (i.e. user-B 408). Presence server 406 utilizes this information to update presence information on behalf of user-B 408 without affecting a SIP E-Tag associated with the original PUBLISH session (PUBLISH message 420) from user-B 408. In this manner, future PUBLISH refresh or modify messages from user-B may be handled without resulting in any pre-condition failures. In an embodiment where a PoC server is enabled to PUBLISH on behalf of a user as part of REGISTER/DEREGISTER, the presence server will use the E-Tag from an original PUBLISH session. Presence updates may be sent to all watchers of a lost user (i.e. user-B 408) indicating status of the lost user as "unavailable" if the current status indicates "available." In this example, if there is no active PUBLISH session for user-B 408 or if user-B's status indicates "unavailable," presence server 406 will respond with an acknowledgement (200 OK) message on receiving a PUBLISH message from the PoC server, but no presence updates will be generated. After receiving a PUBLISH message from the PoC server, the presence server will continue to use the status published by the PoC server on behalf of user-B until a new PUBLISH message is received from user-B. On receiving a new PUBLISH message from the original presence source (i.e. user-B), the presence information from the PoC server will be discarded.

In another embodiment of the invention, a standard PIDF schema is enhanced to provide presence handling. In these embodiments, PIDF schema may handle the same set (or a subset) of information for the same services and/or devices being published by different sources, such as PoC server and user-B, through inclusion of source information in the schema and associated NOTIFY messages. Thus, if a watcher is receiving information about a source from NOTIFY messages then the watcher may take proper action knowing that the status change has been deduced by a network element such as a PoC server as described in FIG. 4. The watcher may then display an appropriate message to a user, e.g. "temporarily unavailable," if the indicated source from the NOTIFY message is other than the watched UE. This mechanism may have an additional advantage that allows a presence server to internally maintain the presence info from each source as a separate PUBLISH session.

One example embodiment of one possible PIDF message that publishes source information is given below with the addition of an <originator> element. This element may be utilized with both PUBLISH and NOTIFY messages. This approach may obviate a need for user-agent field in SIP header as described above.

```
<?xml version="1.0" encoding="UTF-8"?>
<presence xmlns="urn:ietf:params:xml:ns:pidf"
xmlns:op="urn:oma:params:xml:ns:pidf:oma-pres"
entity="sip:someone@example.com">
<tuple id="a1232">
<status>
<basic>closed</basic>
</status>
<op:registration-state>active</op:registration-state>
<op:barring-state>terminated</op:barring-state>
<originator>OMA PoC Server</originator>
<contact>sip:someone@example.com</contact>
<timestamp>2006-04-22T10:25:01Z</timestamp>
</tuple>
</presence>
```

Example 1

PIDF Message with Source Information

Figure 5:
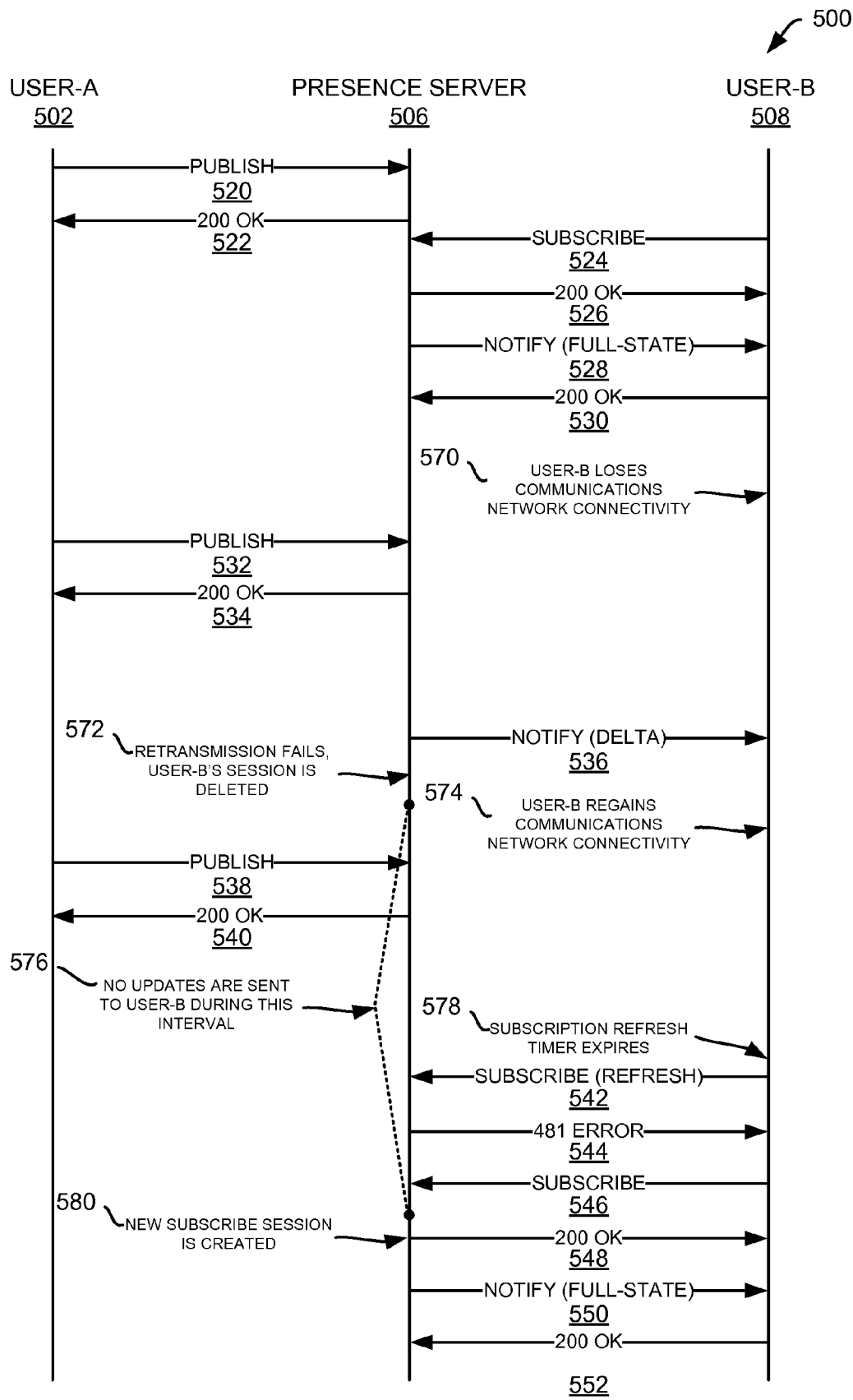
FIG. 5 is an illustrative prior art dataflow diagram illustrating a NOTIFY message delivery failure in accordance with OMA PoC/PAG version 1 specifications.

FIG. 5 is an illustrative prior art dataflow diagram 500 illustrating a NOTIFY message delivery failure in accordance with OMA PoC/PAG version 1 specifications. The dataflow begins when user-A 502 sends a PUBLISH message 520 to presence server 506, whereupon presence server 506 returns acknowledgement (200 OK) message 522 to user-A 502. As noted above, a PUBLISH message typically includes updated presence information about an originator of the message. In this example, user-A's status indicates "available." At some point later in time, user-B 508 sends SUBSCRIBE message 524 to presence server 506, whereupon presence server 506 returns acknowledgement (200 OK) message 526 to user-A 506. Presence server 506 then sends NOTIFY (full-state) message 528 to user-B 508, whereupon user-B 508 returns acknowledgement (200 OK) message 530 to presence server 506. In this example, NOTIFY (full-state) message 528 gives user-B 508 presence information about user-A 502 and all other subscribers to the session that user-B 508 elects to watch. At some point later in time, user-B 508 loses communications network connectivity 570. Network connectivity may be lost in any number of manners including software related issues, hardware related issues, and location related issues.

User-A 502 then sends PUBLISH message 532 to presence server 506, whereupon presence server 506 returns acknowledgement (200 OK) message 534 to user-A 502. User-A's second PUBLISH messages changes user-A's status to "online." Upon receiving PUBLISH message 532, presence server 506 sends NOTIFY (delta) message 536 to user-B 508. Because user-B 508 has lost communications network connectivity, presence server 506 receives no response from user-B 508 and subsequently deletes user-B's session 572. At some point later in time, user-A 502 sends PUBLISH message 538 to presence server 506, whereupon presence server 506 returns acknowledgement (200 OK) message 540 to user-A 502. However, even if user-B has regained connectivity 574 before user-A 502 sends PUBLISH message 538, presence server 506 does not send any updates 576 to user-B 508 because user-B's session was previously deleted. In addition, user-B 508 may utilize a SUBSCRIBE refresh timer to indicate when user-B should refresh the session. Thus, when user-B's SUBSCRIBE refresh time expires 578, user-B sends a SUBSCRIBE refresh message 542 to presence server 506 that results in presence server 506 sending 481 "Transaction Does Not Exist" error message 544 to user-B 508 because of the deleted session.

A SIP user agent for user-B 508 will now send a new SUBSCRIBE message 546 to presence server 506 to start a new session 580, whereupon presence server 506 returns acknowledgement (200 OK) message 548 to user-B 508. Thus, in conventional methods, no updates are send from presence server 506 to user-B 508 from the time user-B's session is deleted until a new session is created 580. Once a new session is created, presence server 506 sends NOTIFY (full-state) message 550 to user-B 508, whereupon user-B 508 returns acknowledgement (200 OK) message 552 to presence server 506. Considering the frequency that a mobile phone user loses communications network connectivity for durations greater than the conventional retransmission intervals of 30 to 60 seconds, the chances of failure to update presence information is very high utilizing conventional methods.

Figure 6:
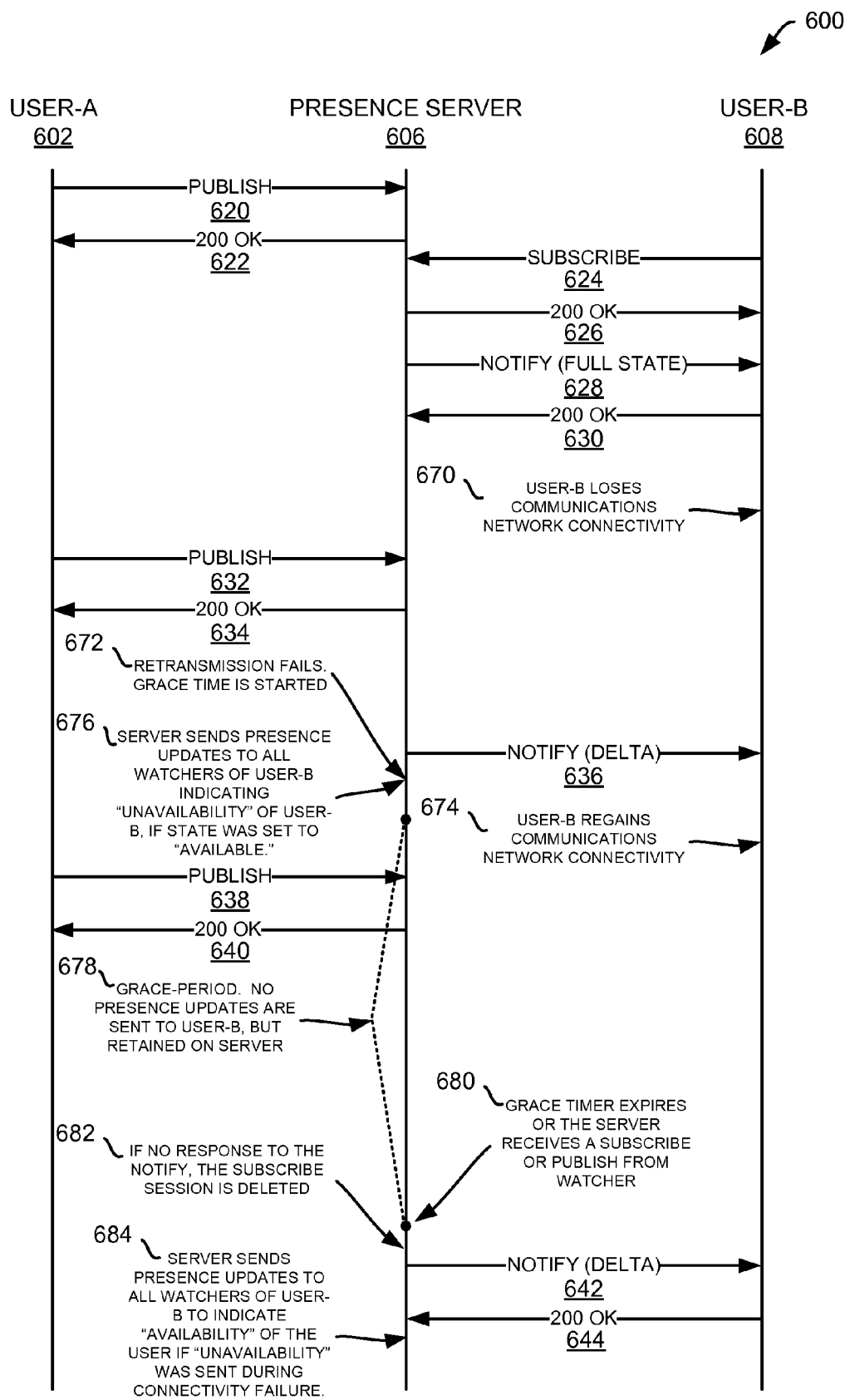
FIG. 6 is an illustrative dataflow diagram illustrating a proposed recovery mechanism for a NOTIFY delivery failure in accordance with embodiments of the present invention.

FIG. 6 is an illustrative dataflow diagram 600 illustrating a proposed recovery mechanism for a NOTIFY delivery failure in accordance with embodiments of the present invention. The dataflow begins when user-A 602 sends a PUBLISH message 620 to presence server 606, whereupon presence server 606 returns acknowledgement (200 OK) message 622 to user-A 602. As noted above, a PUBLISH message typically includes updated presence information about an originator of the message. In this example, user-A's status indicates "available." At some point later in time, user-B 608 sends SUBSCRIBE message 624 to presence server 606, whereupon presence server 606 returns acknowledgement (200 OK) message 626 to user-A 606. Presence server 606 then sends NOTIFY (full-state) message 628 to user-B 608, whereupon user-B 608 returns acknowledgement (200 OK) message 630 to presence server 606. In this example, NOTIFY (full-state) message 628 gives user-B 608 presence information about user-A 602 and all other subscribers to the session that user-B 608 elects to watch. At some point later in time, user-B 608 loses communications network connectivity 670. Network connectivity may be lost in any number of manners including software related issues, hardware related issues, and location related issues.

User-A 602 sends PUBLISH message 632 to presence server 606, whereupon presence server 606 returns acknowledgement (200 OK) message 634 to user-A 602. User-A's second PUBLISH messages changes user-A's status to "online." Upon receiving PUBLISH message 632, presence server 606 sends NOTIFY (delta) message 636 to user-B 608. Instead of deleting user-B's session as in conventional solutions, in an embodiment, presence server 606 starts a grace timer 672 when a NOTIFY message is undeliverable after retransmission attempts. In addition to starting a grace timer, presence server 606 sends presence updates to all watchers of user-B 608, such as user-A 602, indicating user-B's status change to "unavailable" if user-B's status was "available" in an existing PUBLISH session.

During the grace time interval, presence server 606 acts as a presence watcher and stores any pending presence updates for user-B 608. The pending presence updates are delivered when the grace timer expires. In some embodiments, a presence server may be configured to stop a grace timer 680 if any of the following events occurs:

a) the configured grace time interval expires;

b) the presence server receives a SUBSCRIBE request message from the previously disconnected user; or c) the presence server receives a PUBLISH request message from the previously disconnected user.

If the grace timer is stopped due to expiry, the presence server sends a final NOTIFY message 642 with all stored pending updates. If an acknowledgement (200 OK) message 644 is received from the previously disconnected subscriber, the SUBSCRIBE session is restored. If an acknowledgement (200 OK) message is not received from the previously disconnected subscriber 682, the presence server deletes the SUBSCRIBE session for the previously disconnected user. If the grace timer is stopped because the presence server receives either a PUBLISH or SUBSCRIBE message received from the previously disconnected user, the SUBSCRIBE session is restored and any pending updates are delivered 684. In addition, in one embodiment, when a session is restored, presence server 606 sends presence updates to all the watchers of user-B 608 to indicate that user-B 608 is now available, if a presence update was previously sent on behalf of user-B 608 when the grace timer is started.

In some embodiments, a grace timer may be set to a static value that is lower than a configured SUBSCRIBE timer. In low-bandwidth networks, such as a cellular network, the static value is typically set to 30 to 60 minutes in duration, although other durations may be utilized without departing from the present invention. In high-bandwidth networks, such as a LAN network, the static value is typically set to 5 to 15 minutes in duration, although other durations may be utilized without departing from the present invention. In addition, in some embodiments, a grace timer may be set to a dynamic value calculated as the time remaining in a current SUBSCRIBE session plus one minute.

The above embodiments describe one procedure for updating presence status on a failed NOTIFY corresponding with a failed INVITE. However, in some embodiments, a presence server may not be capable to distinguish between a more common user case where a UE has simply lost connectivity from a use case where the communications network is not functioning properly at the presence server end. In an example where a presence server fails to deliver a NOTIFY message because there was a transient failure in the communications network, the presence server would declare a missing user as "unavailable" and send updated NOTIFY messages to all the watchers for the missing user in embodiments described herein. If there are multiple watchers, the presence server would then declare those watchers as missing (because the communications network is down) and duplicate NOTIFY messages to all watchers, which would, in turn generate additional NOTIFY messages. In order to avoid this outcome, in one embodiment of the present invention a presence server may be configured with a threshold set for maximum number of users with activated grace timer and revert back proposed state change for all if the threshold is exceeded such that no extra network load is created in these special conditions. That is, the additional NOTIFY messages are not sent. In addition, no re-PUBLISH will be required from the UEs.

In yet another embodiment of the present invention, a presence server may be enabled to update the user status correctly as soon as the user becomes reachable by implementing a polling mechanism such that the presence server periodically requests a UE to send a PUBLISH message until a PUBLISH message is received from the UE or an original PUBLISH timer expires.

While this invention has been described in terms of several embodiments, there are alterations, permutations, and equivalents, which fall within the scope of this invention. It should also be noted that there are many alternative ways of implementing the methods and apparatuses of the present invention. For example, although a PoC server is utilized for illustrative purposes throughout the disclosure, one skilled in the art will recognize that any communications server configured to send and receive data from users may be utilized without departing from the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for updating presence information between a first user equipment (UE) and a second UE over a Push-to-Talk over Cellular (PoC) communications network, the method comprising:
   publishing a first presence status with a presence server by the second UE, wherein the first presence status indicates that the second UE is available;
   subscribing with the presence server by the first UE, wherein the first UE is subscribed as a watcher to the second UE;
   while the first presence status incorrectly indicates the second UE is available, on an INVITE message delivery failure to the second UE from the first UE, sending a first PUBLISH message on behalf of the second UE to a presence server by a POC communications server indicating that the second UE IS unavailable;
   sending a NOTIFY message to the first UE by the presence server indicating that the second UE is unavailable; and
   setting the first presence status by the presence server to indicate that the second UE is unavailable; and
   sending a NOTIFY message by the presence server to all watchers of the second UE indicating that the second UE is unavailable.

2. The method of claim 1 wherein the first PUBLISH message utilizes a user-agent header to indicate that the communications server originated the first PUBLISH message.

3. The method of claim 2 further comprising: utilizing the first PUBLISH message to indicate the current presence status of the second UE until the presence server receives a second PUBLISH message from the second UE; and when the presence server receives the second PUBLISH message, discarding the first PUBLISH message.

4. The method of claim 1 wherein the NOTIFY message and the first PUBLISH message each utilized an originator field to indicate a source of the current presence status.

5. The method of claim 4 wherein the NOTIFY message and the first PUBLISH message are Presence Information Data Format (PIDF) compliant.

6. The method of claim 5 wherein the presence server maintains presence information from any source as a separate PUBLISH session.

7. The method of claim 1 wherein the communications server includes a PoC server for handling messages and media between the first UE and the second UE.

8. The method of claim 7 wherein the first UE and the second UE each include: a PoC client for communicating with the PoC server; and a user interface for providing user input to the PoC system and for providing PoC system output to a user.

9. The method of claim 8, wherein the PoC client of the second UE sends a message to the presence server when a lost network connection is restored, the message selected from the group consisting of: a PUBLISH message and a SUBSCRIBE refresh message.

10. The method of claim 7 wherein the messages and media are transmitted over an access network and an SIP/IP core.

* * * * *